May 15, 1934. T. E. FOLEY ET AL 1,959,267
ELECTRIC INDICATOR
Filed Dec. 4, 1931   2 Sheets-Sheet 2
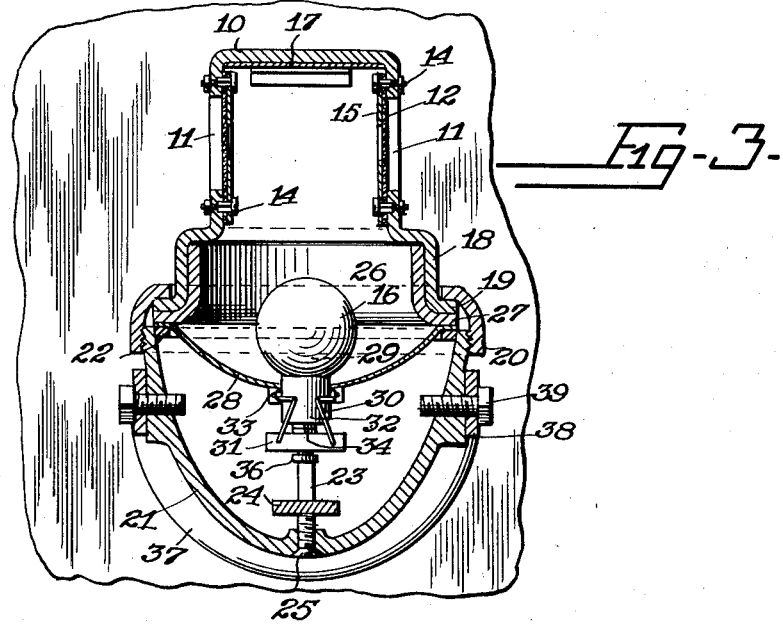
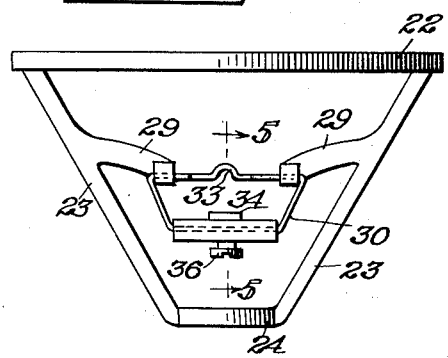
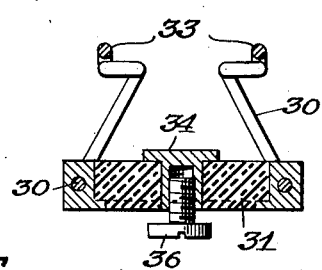
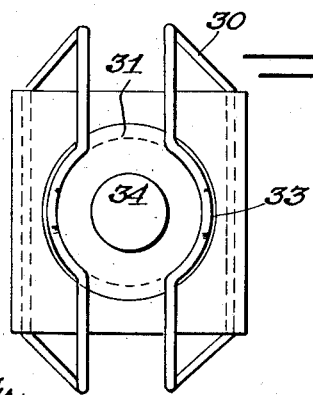
Walter C. Bennison
Thomas E. Foley
INVENTORS
BY Victor J. Evans & Co.
ATTORNEY
WITNESS
H. J. Meader Patented May 15, 1934

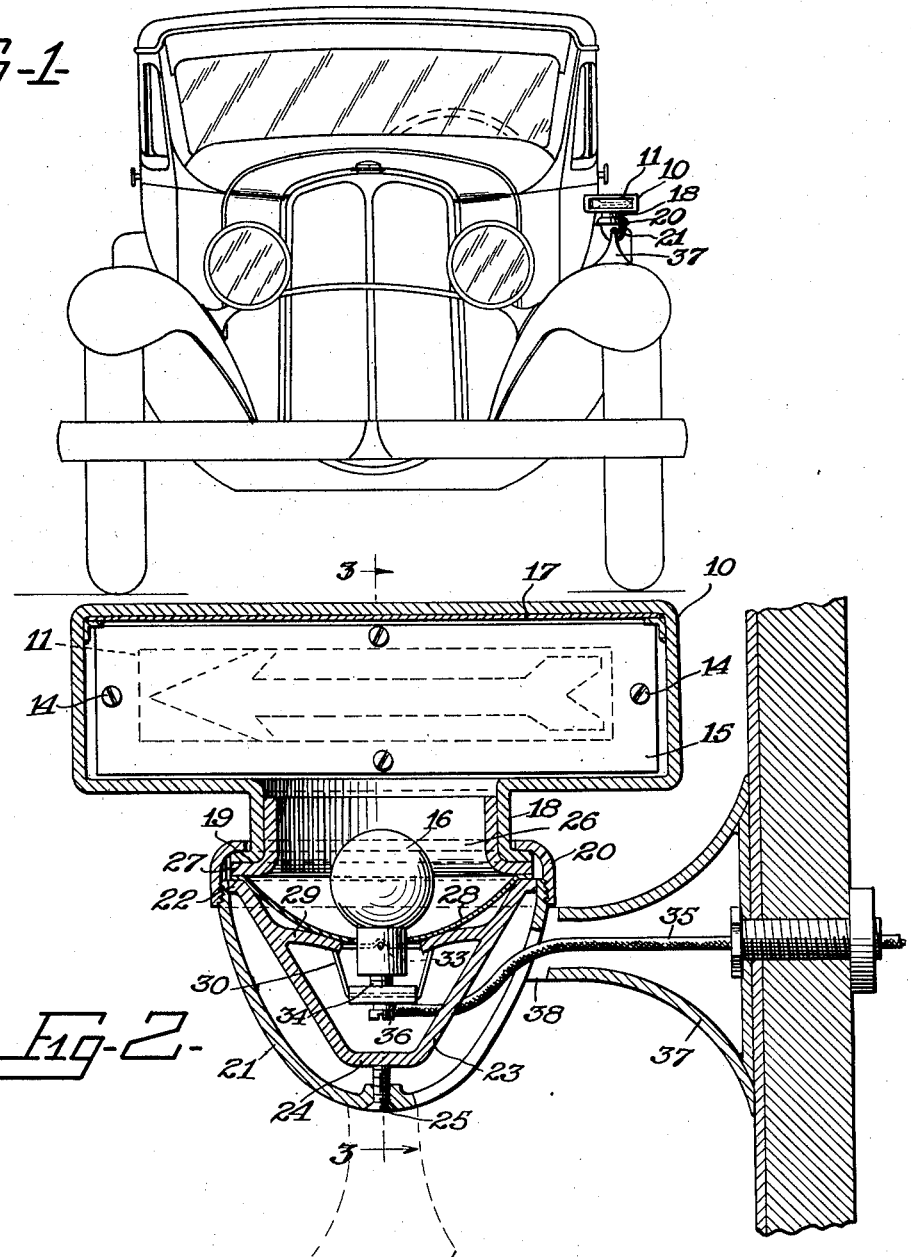

1,959,267

UNITED STATES PATENT OFFICE 1,959,267

ELECTRIC INDICATOR

Thomas E. Foley, Newton, and Walter C. Bennison, Waltham, Mass.

Application December 4, 1931, Serial No. 579,078

1 Claim. (Cl. 177—329)

The object of the invention is to provide a device adapted for mounting on a vehicle and provided with a signal element actuable by the operator of the vehicle to indicate intention to turn; to provide a device of this nature which may be mounted on the body or fender of the vehicle; to provide a construction in which an effective and yet simple support is provided for the illuminating medium; to provide an indicator of simple form and supported above the illuminating medium to be readily removed therefrom in the event that replacement or repair is necessary; and generally to provide a device of this nature which is of simple form and, therefore, susceptible of cheap manufacture.

With this object in view the invention consists in a construction and combination of parts of which a preferred embodiment is illustrated in the accompanying drawings, wherein:

Figure 1 is a front elevational view of a motor vehicle showing the invention applied in operative position thereon.

Figure 2 is a central vertical sectional view through the invention but showing the bracket or base member positioned for side mounting, as on the wall of the vehicle.

Figure 3 is a sectional view on the plane indicated by the line 3—3 of Figure 2.

Figure 4 is a side elevational view of the lamp support and attendant socket member.

Figure 5 is a sectional view on the plane indicated by the line 5—5 of Figure 4.

Figure 6 is a top plan view of the structure of Figure 4.

The indicator comprises an elongated cross-sectionally U-shaped casing 10 of which the front and rear walls are punctured to provide openings 11. Directly behind the openings 11 are placed transparencies 12 which are secured in place by means of bolts 14, the latter also securing against the transparencies the screen members 15 which may be paper, of any color desired. Light thus thrown into the casing 10 will be reflected through the screens and transparencies, so that arrow outlines of the color of the screens will be visible both ahead and to the rear, since the device is adapted for mounting on a vehicle with one open wall of the casing 10 forwardly and the other open wall rearwardly.

Light for the casing 10 is secured from a conventional lamp bulb 16 and this hits a reflector 17 in the top of the casing, so as to be directed through the front and rear walls thereof.

The elongated casing 10 at the center is formed into the circular base portion 18, the bottom edge of which is flared outwardly to provide an annular flange 19 which is engaged by a clamp ring 20 which is threadedly connected with the lamp housing 21, this latter being of a generally globular shape.

Disposed within the lamp housing 21 is a lamp support composed of an upper ring 22 provided with downwardly converging arms 23 which are united with a foot disk 24 at their lower ends. The ring 22 of the lamp support seats in the open upper end of the lamp housing and the foot disk 22 is engaged with an anchoring screw 25 passing through a body hole in the lamp housing and engaging a threaded hole in the foot disk. The top ring 22 serves as a seat for the ring member 26 which is disposed within the circular base portion 18 of the casing 10, the ring 26 having an outturned angular flange 27 seating on the ring. The flange 19 seats on the flange 27 and when the clamp ring 20 is tightened the whole are locked together.

With this assemblage, however, there is also secured the reflector 28 which seats on the ring 22, being disposed between it and the flange 27 of the ring 26.

The arms 23 of the lamp holder are provided with inwardly directed arms 29 which act as a suspension means for the socket support, the latter consisting of the substantially rectangular-shaped wire loop members 30, which are engaged with a metallic block in which is inset an insulating insert 31. These loop members are disposed in upwardly converging relation and are engaged with the arms 29. These loop members have a spring tendency toward each other, so that they may firmly engage and hold the lamp base 32 which is disposed between them at the longitudinal centers where the loops are bowed or formed to arcuate shape. These bowed portions of the loops are bent to form seats 33 for pins carried by the lamp base 32, so that the latter may not rise in its support when the center contact 34 is engaged with the center contact of the lamp base. The loop members are grounded as in the conventional practice and the positive terminal which is the contact 34 is fed from the supply line as indicated at 35, the latter being secured to the contact 34 by means of a binding screw 36.

The base member 37 which may be secured to the fender or to the wall of the car is formed with spaced arms 38 engaging the lamp housing on diametrically opposite sides, these arms being secured to the lamp housing by means of cap screws 39. Obviously loosening the cap screws will permit angular adjustment of the device as a whole with respect to the base member and when the proper position has been secured, depending upon how the base member is mounted, whether flat on the fender or laterally on the body wall, the cap screws may be tightened to maintain the adjusted relation of the parts.

Desiring to make a turn, the operator will close a switch included in the feed line or cable 35 which will result in illumination of the lamp 16, whose rays will be reflected upwardly by the reflector 28 against the reflector 17 and through the openings 11 in the casing.

By reason of the screens placed over the openings in the casing 10, an even controlled light is secured. Further with the screen the light is so diffused that it becomes even and presents none of the disadvantages, such as the effect of a spotlight, that would be obtained if the screens were not used.

To obtain the best results, the invention should be placed on the left front fender so the operator can immediately observe any failure of illumination in the invention; and also permit the invention at all times to be within the view of oncoming vehicles; so that the turning of the motor vehicle to the left will not obscure the invention from the view of the operators of on-coming vehicles.

The invention having been described, what is claimed as new is:

A direction indicator comprising a lamp housing, a lamp support disposed in the lamp housing, the lamp support comprising a ring-like member engaging the walls of the lamp housing and provided with a pair of oppositely disposed arms extending from the casing walls and arranged in converging relation from the open end of the housing, said arms being intermediately formed with lateral extensions directed towards each other, a metallic block provided with an insulating insert, the block being arranged below the plane of said extension, wire loops engaged with said block at their lower ends and swung from said extension at their upper ends, the loops at their upper ends having intermediate oppositely directed bowed portions, and a lamp having its base disposed between said loops in the bowed portions thereof, the loops having a spring tendency towards each other, and a center contact mounted in said insulating insert and engaging the center contact of the lamp base.

WALTER C. BENNISON.
THOMAS E. FOLEY.